(12) United States Patent
Hagiwara et al.

(10) Patent No.: US 9,650,936 B2
(45) Date of Patent: May 16, 2017

(54) ABNORMALITY DETECTION APPARATUS FOR EXHAUST GAS PURIFICATION APPARATUS

(71) Applicant: Toyota Jidosha Kabushiki Kaisha, Toyota-shi, Aichi-ken (JP)

(72) Inventors: Koji Hagiwara, Susono (JP); Toru Kidokoro, Hadano (JP); Yasushi Iwazaki, Ebina (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 319 days.

(21) Appl. No.: 14/613,816

(22) Filed: Feb. 4, 2015

(65) Prior Publication Data
US 2015/0226105 A1    Aug. 13, 2015

(30) Foreign Application Priority Data
Feb. 7, 2014    (JP) ................. 2014-022806

(51) Int. Cl.
*G01M 15/10*    (2006.01)
*F01N 11/00*    (2006.01)
*F01N 3/08*    (2006.01)
*F01N 3/20*    (2006.01)
*F01N 13/00*    (2010.01)

(52) U.S. Cl.
CPC .......... *F01N 11/007* (2013.01); *F01N 3/0871* (2013.01); *F01N 3/0814* (2013.01); *F01N 3/0842* (2013.01); *F01N 3/2066* (2013.01); *F01N 13/009* (2014.06); *F01N 2550/02* (2013.01); *Y02T 10/20* (2013.01); *Y02T 10/47* (2013.01)

(58) Field of Classification Search
USPC ................. 73/114.69, 114.71, 114.72, 114.75
See application file for complete search history.

(56) References Cited

U.S. PATENT DOCUMENTS

2007/0125072 A1    6/2007    McCarthy et al.
2007/0125073 A1    6/2007    Reuter
2007/0209351 A1    9/2007    Chimner et al.
(Continued)

FOREIGN PATENT DOCUMENTS

JP    2009-517599 A    4/2009
WO    2015-045378 A1    4/2015

*Primary Examiner* — Eric S McCall
(74) *Attorney, Agent, or Firm* — Dinsmore & Shohl LLP (57) ABSTRACT

An object of the present invention is to detect an abnormality in an exhaust gas purification apparatus having an NSR catalyst and an SCR catalyst disposed on a downstream side of the NSR catalyst more favorably. Air-fuel ratio reduction control is executed to reduce $NO_x$ occluded to the NSR catalyst when an integrated value of an amount of $NO_x$ flowing into the NSR catalyst reaches an upper limit value of an amount of $NO_x$ that can be occluded to the NSR catalyst in a normal condition. It is determined whether or not the exhaust gas purification apparatus is in an abnormal state on the basis of a $NO_x$ purification ratio of the exhaust gas purification apparatus calculated at this time.

2 Claims, 5 Drawing Sheets

(56) References Cited

U.S. PATENT DOCUMENTS

| | | |
|---|---|---|
| 2010/0132635 A1 | 6/2010 | McCarthy, Jr. et al. |
| 2013/0216436 A1* | 8/2013 | Nakamura ............ F01N 3/0814 422/111 |
| 2014/0003999 A1* | 1/2014 | Nakamura ............ F01N 3/0842 422/68.1 |
| 2016/0186628 A1* | 6/2016 | Saitoh ................... F01N 3/0871 60/276 |
| 2016/0265461 A1* | 9/2016 | Nishijima ............. F01N 3/0842 |
| 2017/0009626 A1* | 1/2017 | Hagiwara ............. F01N 3/0885 |
| 2017/0030244 A1* | 2/2017 | Hagiwara ............. F01N 11/007 |

* cited by examiner

ABNORMALITY DETECTION APPARATUS FOR EXHAUST GAS PURIFICATION APPARATUS

BACKGROUND OF THE INVENTION

1. Field of the Invention

The present invention relates to an abnormality detection apparatus for an exhaust gas purification apparatus, which is used to detect an abnormality in an exhaust gas purification apparatus having an $NO_x$ storage reduction catalyst and an $NO_x$ selective reduction catalyst.

2. Description of the Related Art

A conventional exhaust gas purification apparatus provided in an exhaust passage of a lean burn internal combustion engine capable of operating at a lean air-fuel ratio that is higher than the stoichiometric air-fuel ratio may include an $NO_x$ storage reduction catalyst (also referred to hereafter as an NSR catalyst) and an $NO_x$ selective reduction catalyst (also referred to hereafter as an SCR catalyst). In this type of exhaust gas purification apparatus, the SCR catalyst is disposed on a downstream side of the NSR catalyst in the direction of a flow of exhaust gas flowing through the exhaust passage.

When a peripheral atmosphere of the NSR catalyst is an excessive oxygen atmosphere, the NSR catalyst occludes $NO_x$ contained in the exhaust gas. When an air-fuel ratio of the exhaust gas flowing into the NSR catalyst decreases to an extent at which the peripheral atmosphere becomes a reducing atmosphere, the $NO_x$ occluded to the NSR catalyst is reduced. Further, when the peripheral atmosphere of the NSR catalyst becomes a reducing atmosphere, HC and $H_2$ in the exhaust gas react with $NO_x$ such that $NH_3$ is generated in the NSR catalyst. In the exhaust gas purification apparatus described above, the $NH_3$ is adsorbed to the SCR catalyst. The SCR catalyst selectively reduces the $NO_x$ contained in the exhaust gas using the adsorbed $NH_3$ as a reducing agent.

Japanese Translation of PCT International Application Publication No. 2009-517599 discloses an exhaust gas purification apparatus having an NSR catalyst and an SCR catalyst disposed on the downstream side of the NSR catalyst. In this exhaust gas purification apparatus, a $NO_x$ sensor is provided on an upstream side of the NSR catalyst and a downstream side of the SCR catalyst.

SUMMARY OF THE INVENTION

When an attempt is made in an exhaust gas purification apparatus such as that described above to detect an abnormality in the NSR catalyst and an abnormality in the SCR catalyst individually, an individual $NO_x$ purification ratio of the NSR catalyst and an individual $NO_x$ purification ratio of the SCR catalyst must be determined respectively. In this case, $NO_x$ sensors that detect a $NO_x$ concentration of the exhaust gas may be provided on the upstream side of the NSR catalyst, on the downstream side of the NSR catalyst and the upstream side of the SCR catalyst, and on the downstream side of the SCR catalyst, respectively, and the individual $NO_x$ purification ratios of the respective catalysts may be calculated on the basis of output values from the sensors.

However, a characteristic of a $NO_x$ sensor is that it is unable to detect $NO_x$ and $NH_3$ separately. Hence, the $NO_x$ sensor provided on the downstream side of the NSR catalyst and the upstream side of the SCR catalyst detects the $NH_3$ generated by the NSR catalyst as $NO_x$, and it is therefore difficult to obtain the precise $NO_x$ concentration of the exhaust gas flowing out of the NSR catalyst (the exhaust gas flowing into the SCR catalyst). As a result, the individual $NO_x$ purification ratios of the respective catalysts cannot be calculated with a high degree of precision.

Furthermore, to determine the $NO_x$ purification ratio of the SCR catalyst, $NO_x$ must be caused to flow into the SCR catalyst. However, when the atmosphere on the periphery of the NSR catalyst is an excessive oxygen atmosphere, the majority of the $NO_x$ contained in the exhaust gas is occluded to the NSR catalyst. Therefore, to ensure that a sufficient amount of $NO_x$ to enable accurate calculation of the individual $NO_x$ purification ratio of the SCR catalyst flows into the SCR catalyst, a condition in which an amount of $NO_x$ occluded to the NSR catalyst reaches an upper limit value so that the $NO_x$ in the exhaust gas slips out of the NSR catalyst must be established. To establish this condition, however, reduction of the $NO_x$ occluded to the NSR catalyst must be halted for a rather long period, and as a result, it may be difficult to secure an opportunity to detect an abnormality in the SCR catalyst.

The present invention has been designed in consideration of this problem, and an object thereof is to detect an abnormality in an exhaust gas purification apparatus having an NSR catalyst and an SCR catalyst disposed on a downstream side of the NSR catalyst more favorably.

According to the present invention, when an integrated value of an amount of $NO_x$ flowing into the NSR catalyst reaches an upper limit value of an amount of $NO_x$ that can be occluded to the NSR catalyst in a normal condition, air-fuel ratio reduction control is executed to reduce the $NO_x$ occluded to the NSR catalyst. The presence of an abnormality in the exhaust gas purification apparatus is then determined on the basis of a $NO_x$ purification ratio (i.e. an integrated $NO_x$ purification ratio of the NSR catalyst and the SCR catalyst) of the exhaust gas purification apparatus calculated at this time.

More specifically, an abnormality detection apparatus for an exhaust gas purification apparatus according to the present invention is provided in an exhaust passage of an internal combustion engine, the exhaust gas purification apparatus including an $NO_x$ storage reduction catalyst and an $NO_x$ selective reduction catalyst, the $NO_x$ selective reduction catalyst reducing $NO_x$ using $NH_3$ as a reducing agent, and being disposed on a downstream side of the $NO_x$ storage reduction catalyst, the abnormality detection apparatus including:

an air-fuel ratio control unit that executes air-fuel ratio reduction control to reduce an air-fuel ratio of exhaust gas flowing into the $NO_x$ storage reduction catalyst temporarily to an extent at which a peripheral atmosphere of the $NO_x$ storage reduction catalyst becomes a reducing atmosphere;

a $NO_x$ inflow amount acquisition unit that acquires a $NO_x$ inflow amount, which is an amount of $NO_x$ flowing into the $NO_x$ storage reduction catalyst;

a $NO_x$ outflow amount acquisition unit that acquires a $NO_x$ outflow amount, which is an amount of $NO_x$ flowing out of the $NO_x$ selective reduction catalyst; and a determination unit that determines, when the air-fuel ratio reduction control is executed again by the air-fuel ratio control unit when the integrated value of the $NO_x$ inflow amount following completion of a latest air-fuel ratio reduction control reaches a predetermined threshold, whether or not the exhaust gas purification apparatus is in an abnormal condition on the basis of a $NO_x$ purification ratio of the exhaust gas purification apparatus, which is calculated from an integrated value of the $NO_x$ inflow amount and an integrated value of the $NO_x$ outflow amount over a period extending from a completion point of the latest air-fuel ratio reduction control executed by the air-fuel ratio control unit to completion of the air-fuel ratio reduction control that is executed again by the air-fuel ratio control unit, wherein the threshold is set at an upper limit value of an amount of $NO_x$ that can be occluded to the $NO_x$ storage reduction catalyst in a normal condition.

Here, the period extending from the completion point of the latest air-fuel ratio reduction control to execution of the next air-fuel ratio reduction control will be referred to as an "air-fuel ratio reduction cessation period". In the present invention, the $NO_x$ purification ratio of the exhaust gas purification apparatus is calculated from the integrated value of the $NO_x$ inflow amount (the amount of $NO_x$ flowing into the NSR catalyst) and the integrated value of the $NO_x$ outflow amount (the amount of $NO_x$ flowing out of the SCR catalyst) over the air-fuel ratio reduction cessation period and the execution period of the air-fuel ratio reduction control executed thereafter.

In the present invention, when the NSR catalyst is in a normal condition, the $NO_x$ contained in the exhaust gas that flows into the NSR catalyst is occluded to the NSR catalyst during the air-fuel ratio reduction cessation period. When the NSR catalyst is in an abnormal condition, however, the amount of $NO_x$ that can be occluded is lower than when the NSR catalyst is in a normal condition. Hence, when the NSR catalyst is in an abnormal condition, a part of the $NO_x$ that flows into the NSR catalyst during the air-fuel ratio reduction cessation period (i.e. $NO_x$ exceeding an upper limit value of the amount of $NO_x$ that can be occluded to the NSR catalyst in an abnormal condition) flows out of the NSR catalyst. Accordingly, a part of the $NH_3$ adsorbed in the SCR catalyst is consumed to reduce this $NO_x$.

Here, when the NSR catalyst is in an abnormal condition, the amount of $NH_3$ adsorbed in the SCR catalyst at the completion point of the latest air-fuel ratio reduction control is smaller than when the NSR catalyst is in a normal condition. Moreover, when the NSR catalyst is in an abnormal condition, the amount of $NH_3$ adsorbed in the SCR catalyst at the time of execution of the air-fuel ratio reduction control that follows the air-fuel ratio reduction cessation period is even further reduced by the amount of $NH_3$ consumed to reduce the $NO_x$ as described above. In other words, when the NSR catalyst is in an abnormal condition, a reduction in the amount of $NH_3$ adsorbed in the SCR catalyst relative to the $NH_3$ adsorption amount when the NSR catalyst is in a normal condition increases as the amount of $NO_x$ flowing out of the NSR catalyst during the air-fuel ratio reduction cessation period increases.

The amount of $NO_x$ reduced by the SCR catalyst during execution of the air-fuel ratio reduction control decreases as the amount of $NH_3$ adsorbed in the SCR catalyst at the time of execution of the air-fuel ratio reduction control decreases. In other words, the $NO_x$ purification ratio of the exhaust gas purification apparatus following execution of the air-fuel ratio reduction control decreases as the amount of $NH_3$ adsorbed in the SCR catalyst at a start point of the air-fuel ratio reduction control decreases. According to the present invention, therefore, the $NO_x$ purification ratio of the exhaust gas purification apparatus decreases by a larger amount when the NSR catalyst is in an abnormal condition than when the NSR catalyst is in a normal condition. As a result, the precision with which the presence of an abnormality in the exhaust gas purification apparatus is determined on the basis of the $NO_x$ purification ratio can be improved.

Furthermore, in the present invention, when the SCR catalyst is in an abnormal condition, the amount of $NH_3$ adsorbed to the SCR catalyst during execution of the latest air-fuel ratio reduction control is smaller than the $NH_3$ adsorption amount when the SCR catalyst is in a normal condition. Moreover, the amount of $NH_3$ adsorbed in the SCR catalyst is substantially maintained during the air-fuel ratio reduction cessation period. According to the present invention, therefore, when the SCR catalyst is in an abnormal condition, the $NO_x$ purification ratio of the exhaust gas purification apparatus is smaller than when the SCR catalyst is in a normal condition.

Hence, according to the present invention, when either the NSR catalyst or the SCR catalyst is in an abnormal condition, the abnormality can be detected with a high degree of precision as an abnormality in the exhaust gas purification apparatus. Further, an abnormality in the exhaust gas purification apparatus can be detected without lengthening the air-fuel ratio reduction cessation period to such an extent that $NO_x$ slips out of the NSR catalyst in a normal condition, and as a result, an opportunity for abnormality detection can be secured easily.

Note that when the abnormality determination is performed by the determination unit in the present invention, the $NO_x$ purification ratio of the exhaust gas purification apparatus may be calculated on the assumption that the integrated value of the $NO_x$ inflow amount during the air-fuel ratio reduction cessation period and the execution period of the air-fuel ratio reduction control executed thereafter takes a predetermined fixed value.

In the present invention, a target air-fuel ratio and a control execution period of the latest air-fuel ratio reduction control executed by the air-fuel ratio control unit may be set such that an amount of $NH_3$ adsorbed in the SCR catalyst upon completion of the precious air-fuel ratio reduction control is equivalent to a total amount of $NO_x$ flowing out of the NSR catalyst during an execution period of the air-fuel ratio reduction control executed again by the air-fuel ratio control unit, when both the NSR catalyst and the SCR catalyst are in a normal condition.

According to the configuration described above, a difference in the $NO_x$ purification ratio of the exhaust gas purification apparatus, which is calculated when the determination unit determines the presence of an abnormality in the exhaust gas purification apparatus, between a case in which the NSR catalyst or the SCR catalyst is in an abnormal condition and a case in which the catalysts are both in a normal condition can be increased. As a result, an abnormality can be detected in the exhaust gas purification apparatus with a higher degree of precision.

According to the present invention, an abnormality in an exhaust gas purification apparatus having an NSR catalyst and an SCR catalyst disposed on a downstream side of the NSR catalyst can be detected more favorably.

DESCRIPTION OF THE PREFERRED EMBODIMENTS

Specific embodiments of the present invention will be described below on the basis of the drawings. Unless specified otherwise, the technical scope of the present invention is not limited to dimensions, materials, shapes, relative arrangements, and so on of constituent components described in the embodiments.

First Embodiment

[Outline of Configuration]

Figure 1:
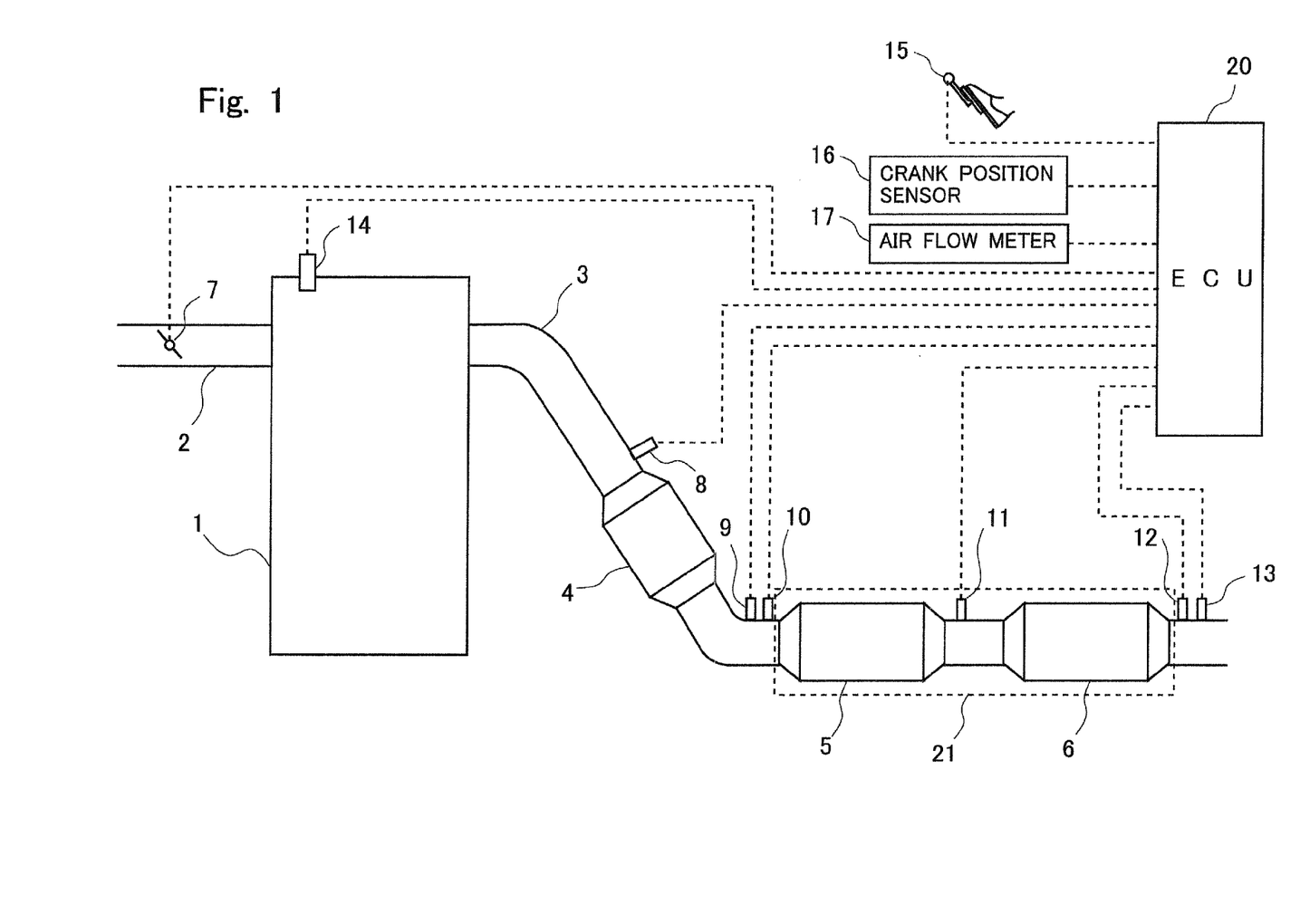
FIG. 1 is a schematic view showing a configuration of an internal combustion engine according to an embodiment and an intake/exhaust system thereof.

FIG. 1 is a schematic view showing a configuration of an internal combustion engine according to this embodiment and an intake/exhaust system thereof. An internal combustion engine 1 shown in FIG. 1 is a lean burn gasoline engine capable of operating at a lean air-fuel ratio that is higher than the stoichiometric air-fuel ratio. The internal combustion engine 1 includes a fuel injection valve 14. The fuel injection valve 14 is provided for each cylinder. The fuel injection valve 14 may be an injection valve that injects fuel into an intake port of each cylinder, or an injection valve that injects fuel directly into the cylinder.

An intake passage 2 and an exhaust passage 3 are connected to the internal combustion engine 1. A throttle valve 7 is provided in the intake passage 2. The throttle valve 7 adjusts an intake air amount of the internal combustion engine 1 by varying a sectional area of an air flow passage in the intake passage 2.

A three-way catalyst 4, an NSR catalyst 5, and an SCR catalyst 6 are provided in the exhaust passage 3 in that order from an upstream side of an exhaust gas flow direction. In this embodiment, the NSR catalyst 5 and the SCR catalyst 6 will be referred to collectively as an exhaust gas purification apparatus 21.

The three-way catalyst 4 is provided on an upstream side of the NSR catalyst 5 and the SCR catalyst 6 in the exhaust passage 3, and has a smaller thermal capacity than the other catalysts. Therefore, when a cold start is performed on the internal combustion engine 1, the three-way catalyst 4 is activated earlier than the NSR catalyst 5 and the SCR catalyst 6. Hence, when the internal combustion engine 1 is operated at the stoichiometric air-fuel ratio during a cold start, exhaust gas is purified mainly by the three-way catalyst 4.

When the internal combustion engine 1 is operated at a lean air-fuel ratio that is higher than the stoichiometric air-fuel ratio and a peripheral atmosphere of the NSR catalyst 5 is an excessive oxygen atmosphere, the NSR catalyst 5 occludes $NO_x$ contained in the exhaust gas. When the air-fuel ratio of the exhaust gas flowing into the NSR catalyst 5 is reduced to an extent at which the peripheral atmosphere becomes a reducing atmosphere by executing a rich spike, to be described below, the $NO_x$ occluded to the NSR catalyst 5 is reduced using HC and CO (unburned fuel components) contained in the exhaust gas as a reducing agent.

Further, when the rich spike to be described below is executed, $NH_3$ is generated in the three-way catalyst 4 and the NSR catalyst 5. The $NH_3$ is adsorbed to the SCR catalyst 6. The $NO_x$ in the exhaust gas is then selectively reduced by the SCR catalyst 6 using the adsorbed $NH_3$ as a reducing agent.

An A/F sensor 8 is provided in the exhaust passage 3 on an upstream side of the three-way catalyst 4. The A/F sensor 8 detects the air-fuel ratio of the exhaust gas that flows into the three-way catalyst 4 after being discharged from the internal combustion engine 1.

An $O_2$ sensor 9 and a first $NO_x$ sensor 10 are provided in the exhaust passage 3 on a downstream side of the three-way catalyst 4 and an upstream side of the NSR catalyst 5. The $O_2$ sensor 9 detects an $O_2$ concentration of the exhaust gas that flows into the NSR catalyst 5 after flowing out of the three-way catalyst 4, while the first $NO_x$ sensor 10 detects a $NO_x$ concentration of the exhaust gas.

A first temperature sensor 11 is provided in the exhaust passage 3 on a downstream side of the NSR catalyst 5 and an upstream side of the SCR catalyst 6. The first temperature sensor 11 detects a temperature of the exhaust gas that flows into the SCR catalyst 6 after flowing out of the NSR catalyst 5.

A second $NO_x$ sensor 12 and a second temperature sensor 13 are provided in the exhaust passage 3 on a downstream side of the SCR catalyst 6. The second $NO_x$ sensor 12 detects the $NO_x$ concentration of the exhaust gas that flows out of the SCR catalyst 6, while the second temperature sensor 13 detects the temperature of the exhaust gas.

Further, an electronic control unit (ECU) 20 is provided alongside the internal combustion engine 1 in order to control the internal combustion engine 1. The ECU 20 controls the internal combustion engine 1 in accordance with operating conditions of the internal combustion engine 1 and requirements of a driver.

The A/F sensor 8, the O2 sensor 9, the first $NO_x$ sensor 10, the first temperature sensor 11, the second $NO_x$ sensor 12, and the second temperature sensor 13 are electrically connected to the ECU 20. Other sensors, such as an accelerator depression amount sensor 15, a crank position sensor 16, and an air flow meter 17, are likewise electrically connected to the ECU 20. The accelerator depression amount sensor 15 detects an operation amount of an accelerator pedal (an accelerator position). The crank position sensor 16 detects a rotation position of an output shaft (a crankshaft) of the internal combustion engine 1. The air flow meter 17 detects an intake air amount of the internal combustion engine 1. Output values from the respective sensors are input into the ECU 20.

The fuel injection valve 14 and the throttle valve 7 are also electrically connected to the ECU 20. These apparatuses are thus controlled by the ECU 20.

For example, the ECU 20 calculates an engine rotation speed of the internal combustion engine 1 on the basis of the output value of the crank position sensor 16. Further, the ECU 20 calculates an engine load of the internal combustion engine 1 on the basis of the output value of the accelerator depression amount sensor 15. Furthermore, the ECU 20 sets a target air-fuel ratio of an air-fuel mixture in the internal combustion engine 1 on the basis of the calculated engine rotation speed and engine load. Note that according to this embodiment, in a normal operating region (a medium load and low/medium rotation speed region), the target air-fuel ratio is set at a lean air-fuel ratio that is higher than the stoichiometric air-fuel ratio. In a low load region during startup or idling, a high load region, and a high rotation speed region, the target air-fuel ratio of the internal combustion engine is set at the stoichiometric air-fuel ratio.

The ECU 20 then controls a fuel injection amount of the fuel injection valve 14 on the basis of the set target air-fuel ratio and the output value of the air flow meter 17 (i.e. the intake air amount). Further, the ECU 20 executes feedback control on the air-fuel ratio on the basis of the output values of the A/F sensor 8 and the $O_2$ sensor 9.

[$NO_x$ Purification by NSR Catalyst and SCR Catalyst]

When the internal combustion engine 1 is operated at a lean air-fuel ratio, a $NO_x$ reduction function of the three-way catalyst 4 cannot be activated sufficiently. At this time, therefore, the $NO_x$ contained in the exhaust gas is purified mainly by the NSR catalyst 5 and the SCR catalyst 6.

When the internal combustion engine 1 is operated at a lean air-fuel ratio, the atmosphere on the periphery of the NSR catalyst 5 is an excessive oxygen atmosphere, and therefore the $NO_x$ in the exhaust gas is occluded to the NSR catalyst 5. To reduce the $NO_x$ occluded to the NSR catalyst 5, a so-called rich spike, in which the air-fuel ratio of the exhaust gas flowing into the NSR catalyst 5 is temporarily reduced to a predetermined rich air-fuel ratio that is lower than the stoichiometric air-fuel ratio, is executed. The rich spike according to this embodiment is realized by adjusting the fuel injection amount and a fuel injection timing from the fuel injection valve 14 so that the air-fuel ratio of the exhaust gas discharged from the internal combustion engine 1 is reduced. Further, during execution of the rich spike, the intake air amount of the internal combustion engine 1 may be reduced by reducing an opening of the throttle valve 7.

Note that the target air-fuel ratio of the rich spike does not necessarily have to be a rich air-fuel ratio, and as long as the atmosphere on the periphery of the NSR catalyst 5 becomes a reducing atmosphere in which the occluded $NO_x$ can be reduced, the target air-fuel ratio may be the stoichiometric air-fuel ratio or a slightly higher air-fuel ratio than the stoichiometric air-fuel ratio.

The rich spike is executed before the amount of $NO_x$ occluded to the NSR catalyst 5 reaches an upper limit value of an amount of $NO_x$ that can be occluded when the NSR catalyst 5 is in a normal condition. More specifically, an amount of $NO_x$ flowing into the NSR catalyst 5 is calculated by the ECU 20 on the basis of the output value of the first $NO_x$ sensor 10 and the output value of the air flow meter 17. Note that the amount of $NO_x$ flowing into the NSR catalyst 5 may also be estimated on the basis of the operating conditions of the internal combustion engine 1. The rich spike is executed when an integrated value of the amount of $NO_x$ flowing into the NSR catalyst 5 following completion of a latest rich spike reaches a predetermined threshold.

Note that the method of determining the execution timing of the rich spike is not limited to the method described above. For example, the rich spike may be executed at a timing where an integrated value of the fuel injection amount of the internal combustion engine 1, an operating time of the internal combustion engine 1, or a distance traveled by a vehicle installed with the internal combustion engine 1 following completion of the latest rich spike reaches a predetermined threshold.

Here, when the rich spike is executed, apart of the $NO_x$ occluded to the NSR catalyst 5 flows out of the NSR catalyst 5 without being reduced. In this embodiment, the $NO_x$ that flows out of the NSR catalyst 5 flows into the SCR catalyst 6. The $NO_x$ that flows into the SCR catalyst 6 is reduced by the SCR catalyst 6.

However, to reduce the $NO_x$ in the SCR catalyst 6, the $NH_3$ that serves as the reducing agent must be adsorbed in the SCR catalyst 6. $NH_3$ is generated by the three-way catalyst 4 and the NSR catalyst 5 when the rich spike is executed. When the rich spike is executed, CO, HC, and $H_2O$ in the exhaust gas react with each other in the three-way catalyst 4 and the NSR catalyst 5 due to a water gas shift reaction or a steam reforming reaction, whereby $H_2$ is generated. The $H_2$ further reacts with NO in the exhaust gas, and as a result, $NH_3$ is generated.

In other words, when the rich spike is executed, $NO_x$ flows out of the NSR catalyst 5, the $NH_3$ adsorbed in the SCR catalyst 6 is consumed during reduction of the $NO_x$, and the $NH_3$ newly generated by the three-way catalyst 4 and the NSR catalyst 5 is adsorbed to the SCR catalyst 6. The $NH_3$ adsorbed to the SCR catalyst 6 at this time is consumed for reduction of the $NO_x$ that flows out of the NSR catalyst 5 when a next rich spike is executed.

Note that in cases where a large amount of $NO_x$ is occluded to the NSR catalyst 5, a large amount of $NO_x$ is discharged from the internal combustion engine 1, and so on, $NO_x$ may flow out of the NSR catalyst 5 even when the rich spike is not executed. Likewise in these cases, the $NH_3$ adsorbed in the SCR catalyst 6 is consumed to reduce the $NO_x$ that flows out of the NSR catalyst 5, and as a result, the amount of $NH_3$ adsorbed in the SCR catalyst 6 decreases. When the next rich spike is executed in a condition where the amount of $NH_3$ adsorbed in the SCR catalyst 6 is insufficient, it may be difficult to reduce the $NO_x$ that flows out of the NSR catalyst 5 during the rich spike sufficiently in the SCR catalyst 6.

Hence, in this embodiment, the amount of $NH_3$ adsorbed in the SCR catalyst 6 is maintained at a certain amount by executing the rich spike at a point where the amount of $NH_3$ adsorbed in the SCR catalyst 6 decreases to a predetermined threshold. The amount of $NH_3$ adsorbed in the SCR catalyst 6 is calculated by the ECU 20 by subtracting an amount of $NH_3$ consumed for $NO_x$ reduction by the SCR catalyst 6 following completion of the rich spike from a total amount of $NH_3$ generated by the three-way catalyst 4 and the NSR catalyst 5 (in other words, a total amount of $NH_3$ flowing into the SCR catalyst 6) during execution of the rich spike.

The total amount of $NH_3$ generated by the three-way catalyst 4 and the NSR catalyst 5 during execution of the rich spike can be estimated on the basis of the target air-fuel ratio during the rich spike, an execution period of the rich spike, an amount of $NO_x$ occluded to the three-way catalyst 4 and the NSR catalyst 5 at an execution start point of the rich spike, and so on. For example, the amount of $NH_3$ generated by the three-way catalyst 4 and the NSR catalyst 5 during the rich spike execution period increases as the target air-fuel ratio of the rich spike decreases and the rich spike execution period lengthens. Further, the amount of $NH_3$ consumed for $NO_x$ reduction by the SCR catalyst 6 can be estimated on the basis of the amount of $NO_x$ flowing into the SCR catalyst 6 and the amount of $NO_x$ flowing out of the SCR catalyst 6.

The amount of $NO_x$ flowing out of the SCR catalyst 6 can be calculated on the basis of the output value of the second $NO_x$ sensor. The amount of $NO_x$ flowing into the SCR catalyst 6, meanwhile, can be estimated on the basis of the amount of $NO_x$ flowing into the NSR catalyst 5 and the amount of $NO_x$ occluded to the NSR catalyst 5 at that time. Note that a $NO_x$ sensor may also be provided in the exhaust passage 3 between the NSR catalyst 5 and the SCR catalyst 6, and the amount of $NO_x$ flowing into the SCR catalyst 6 may be calculated on the basis of an output value from this $NO_x$ sensor.

In this embodiment, execution of the rich spike is stopped at a point following the start of the rich spike where the total amount of $NH_3$ generated by the three-way catalyst 4 and the NSR catalyst 5 and adsorbed to the SCR catalyst 6 can be determined to have reached a sufficient amount to reduce the $NO_x$ in the SCR catalyst 6. For example, the amount of $NH_3$ generated by the three-way catalyst 4 and the NSR catalyst 5 during the rich spike execution period may be estimated, and execution of the rich spike may be stopped when an integrated value thereof reaches a predetermined amount. Execution of the rich spike may also be stopped when a predetermined time at which the amount of $NH_3$ adsorbed in the SCR catalyst 6 can be determined to have reached a sufficient amount elapses. In this case, the predetermined time is determined in advance on the basis of experiments and the like. Further, upon completion of the rich spike, a maximum amount of the $NO_x$ occluded to the NSR catalyst 5 has been reduced, and therefore the amount of $NO_x$ occluded to the NSR catalyst 5 is close to zero.

[Method of Detecting Abnormality in Exhaust Gas Purification Apparatus]

Next, a method of detecting an abnormality in the exhaust gas purification apparatus 21 according to this embodiment will be described with reference to FIGS. 2 and 3. In this embodiment, rather than detecting an abnormality in the NSR catalyst 5 and an abnormality in the SCR catalyst 6 individually, an abnormality is detected in the integrated exhaust gas purification apparatus 21. In other words, when, in this embodiment, either the NSR catalyst 5 or the SCR catalyst 6 is in an abnormal condition, the exhaust gas purification apparatus 21 is determined to be in an abnormal condition without specifying the catalyst that is in the abnormal condition.

Here, a period extending from completion of the latest rich spike to execution of the next rich spike will be referred to as a "rich spike cessation period". Further, the amount of $NO_x$ flowing into the NSR catalyst 5 will be referred to as a "$NO_x$ inflow amount", and the amount of $NO_x$ flowing out of the SCR catalyst 6 will be referred to as a "$NO_x$ outflow amount".

In this embodiment, a $NO_x$ purification ratio $Rpno_x$ of the exhaust gas purification apparatus 21 is calculated on the basis of an integrated value $dNO_x nin$ of the $NO_x$ inflow amount and an integrated value $dNO_x soutj$ of the $NO_x$ outflow amount during the rich spike cessation period and the execution period of the rich spike executed thereafter. More specifically, the $NO_x$ purification ratio $Rpno_x$ of the exhaust gas purification apparatus 21 according to this embodiment is defined by Equation (1) shown below.

$$Rpno_x = 1 - (dNO_x soutj / dNO_x ninj)$$ Equation (1)

Further, according to this embodiment, when it is determined whether or not the exhaust gas purification apparatus 21 is in an abnormal condition, the rich spike cessation period is set to be longer than normal (i.e. when the abnormality determination is not performed on the exhaust gas purification apparatus 21). More specifically, the rich spike cessation period is set at a period extending to a point at which the integrated value of the $NO_x$ inflow amount following completion of the latest rich spike reaches a predetermined determination execution value, which is the upper limit value of the amount of $NO_x$ that can be occluded to the NSR catalyst 5 in a normal condition. Then, it is determined whether or not the exhaust gas purification apparatus 21 is in an abnormal condition on the basis of the $NO_x$ purification ratio calculated from Equation (1) when the rich spike is executed following this rich spike cessation period.

(When NSR Catalyst is in Abnormal Condition)

Figure 2:
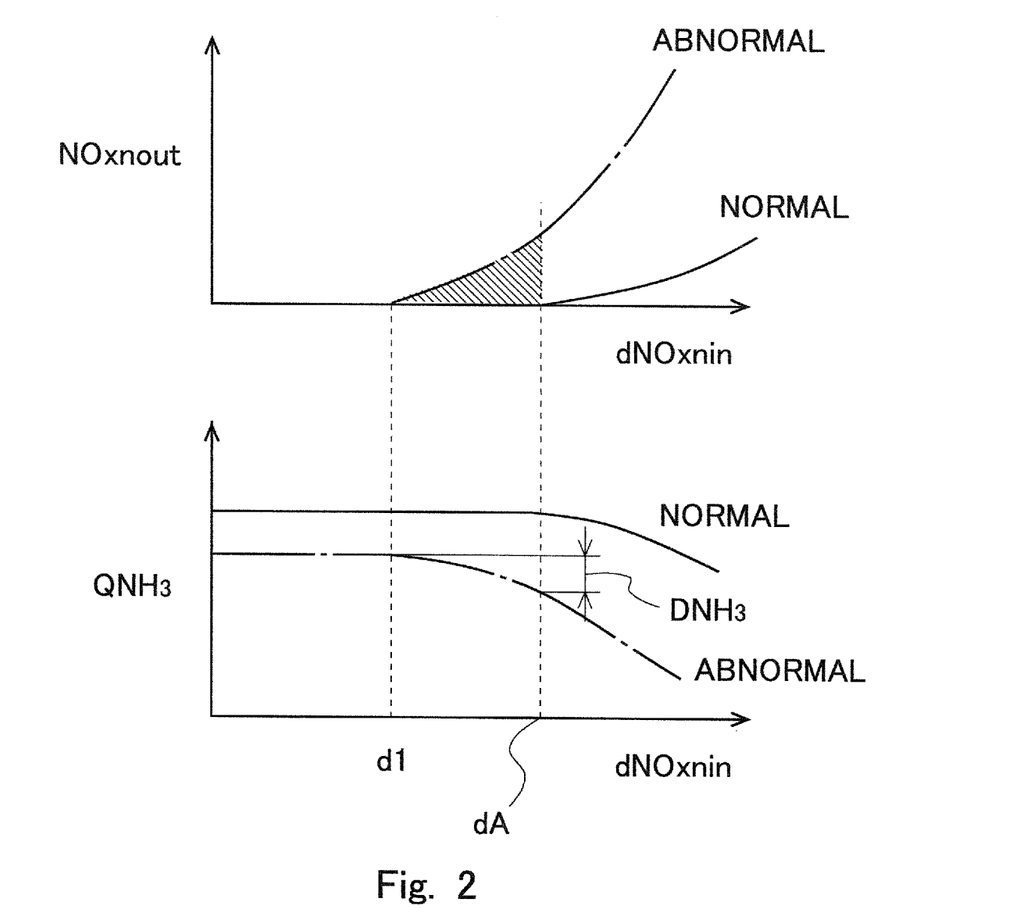
FIG. 2 is a view showing respective transitions of an integrated value $dNO_x$nin of a $NO_x$ inflow amount into an NSR catalyst, a $NO_x$ outflow amount $NO_x$nout from the NSR catalyst, and an $NH_3$ adsorption amount $QNH_3$ in the SCR catalyst in a case where an air-fuel ratio of exhaust gas is a lean air-fuel ratio.

FIG. 2 is a view showing respective transitions of the integrated value $dNO_x nin$ of the $NO_x$ inflow amount, a $NO_x$ outflow amount $NO_x nout$ from the NSR catalyst 5, and an $NH_3$ adsorption amount $QNH_3$ in the SCR catalyst 6 in a case where the air-fuel ratio of the exhaust gas is a lean air-fuel ratio. In FIG. 2, solid lines indicate a case in which the NSR catalyst 5 is in a normal condition, and dot-dash lines indicate a case in which the NSR catalyst 5 is in an abnormal condition.

When the amount of $NO_x$ occluded to the NSR catalyst 5 reaches the upper limit value, the $NO_x$ flowing into the NSR catalyst 5 slips out of the NSR catalyst 5 without being occluded. Here, when the NSR catalyst 5 is in an abnormal condition, the amount of $NO_x$ that can be occluded to the NSR catalyst 5 (the upper limit value of the amount of $NO_x$ that can be occluded) is smaller than when the NSR catalyst 5 is in a normal condition. As shown in FIG. 2, therefore, when the NSR catalyst 5 is in an abnormal condition, $NO_x$ starts to flow out of the NSR catalyst 5 at a point (a point at which $dNO_x nin$ reaches d1 in FIG. 2) where the integrated value $dNO_x nin$ of the $NO_x$ inflow amount becomes smaller than the integrated value $dNO_x nin$ obtained when the NSR catalyst 5 is in a normal condition. The $NH_3$ adsorbed in the SCR catalyst 6 is consumed for reduction of the $NO_x$ that flows out of the NSR catalyst 5. Accordingly, when the NSR catalyst 5 is in an abnormal condition, as shown in FIG. 2, the $NH_3$ adsorption amount $QNH_3$ of the SCR catalyst 6 starts to decrease at the point where the integrated value $dNO_x nin$ of the $NO_x$ inflow amount becomes smaller than the integrated value $dNO_x nin$ obtained when the NSR catalyst 5 is in a normal condition.

As described above, when it is determined whether or not the exhaust gas purification apparatus 21 is in an abnormal condition according to this embodiment, the rich spike cessation period is set at a period extending to the point at which the integrated value of the $NO_x$ inflow amount following completion of the latest rich spike reaches the predetermined determination execution value (dA in FIG. 2), i.e. the upper limit value of the amount of $NO_x$ that can be occluded to the NSR catalyst 5 in a normal condition. In other words, the predetermined determination execution value dA is set such that when the upper limit value of the amount of $NO_x$ that can be occluded to the NSR catalyst 5 equals or exceeds the determination execution value dA, the NSR catalyst 5 can be determined to be in a normal condition, and when the upper limit value of the amount of $NO_x$ that can be occluded to the NSR catalyst 5 is smaller than the determination execution value dA, the NSR catalyst 5 can be determined to be in an abnormal condition. Note that in a normal condition, the NSR catalyst 5 is capable of occluding and reducing an amount of $NO_x$ required to satisfy the individual $NO_x$ purification ratio of the NSR catalyst prescribed by law.

Here, when the NSR catalyst 5 is in an abnormal condition, the amount of $NH_3$ adsorbed in the SCR catalyst 6 upon completion of the latest rich spike is smaller than when the NSR catalyst 5 is in a normal condition. Further, when the NSR catalyst 5 is in an abnormal condition, an amount of $NH_3$ required to reduce an amount of $NO_x$ indicated by shading in FIG. 2 has been consumed by the SCR catalyst 6 at the point where the integrated value of the $NO_x$ inflow amount following completion of the latest rich spike reaches the determination execution value dA. Therefore, the $NH_3$ adsorption amount $QNH_3$ of the SCR catalyst 6 at the time of execution of the rich spike following the rich spike cessation period is even further reduced by the amount of $NH_3$ thus consumed (in FIG. 2, $DNH_3$ shows the amount of consumed NH$_3$ at this time). Hence, when the NSR catalyst 5 is in an abnormal condition, a reduction in the amount of NH$_3$ adsorbed in the SCR catalyst 6 relative to the NH$_3$ adsorption amount when the NSR catalyst 5 is in a normal condition increases as the amount of NO$_x$ flowing out of the NSR catalyst 5 during the rich spike cessation period increases.

The amount of NO$_x$ reduced by the SCR catalyst 6 at the time of execution of the rich spike following the rich spike cessation period decreases as the amount of NH$_3$ adsorbed in the SCR catalyst 6 upon execution of the rich spike decreases. In other words, the NO$_x$ purification ratio of the exhaust gas purification apparatus 21 following execution of the rich spike decreases as the amount of NH$_3$ adsorbed in the SCR catalyst 6 at the start of the rich spike decreases. According to this embodiment, therefore, the NO$_x$ purification ratio of the exhaust gas purification apparatus 21, calculated from Equation (1) shown above, decreases by a larger amount when the NSR catalyst 5 is in an abnormal condition than when the NSR catalyst 5 is in a normal condition. As a result, the precision with which the presence of an abnormality in the exhaust gas purification apparatus 21 is determined on the basis of the NO$_x$ purification ratio can be improved.

[When SCR Catalyst is in Abnormal Condition]

Figure 3:
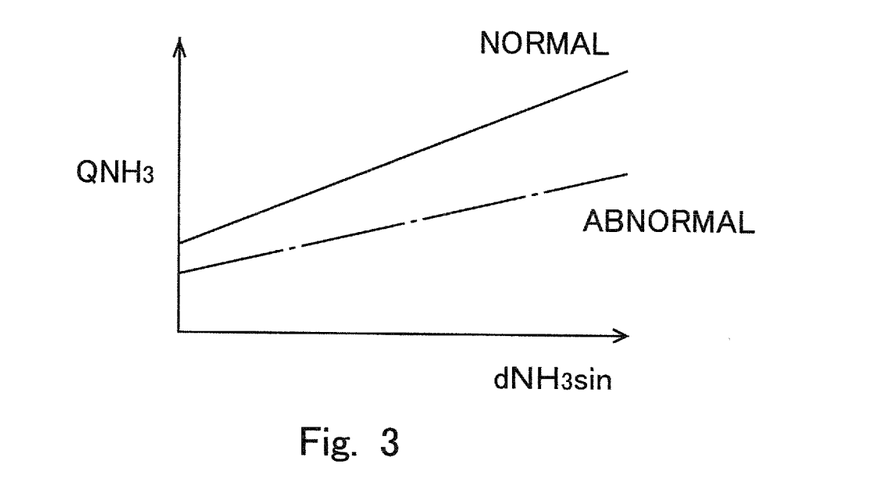
FIG. 3 is a view showing the transition of the $NH_3$ adsorption amount $QNH_3$ in the SCR catalyst during a rich spike execution period.

FIG. 3 is a view showing the transition of the NH$_3$ adsorption amount QNH$_3$ in the SCR catalyst 6 during the rich spike execution period. Note that here, FIG. 3 shows the transition of the NH$_3$ adsorption amount QNH$_3$ when newly generated NH$_3$ flows into the SCR catalyst 6 after the rich spike is executed such that the NH$_3$ adsorbed in the SCR catalyst 6 is consumed in order to reduce the NO$_x$ flowing into the SCR catalyst 6. The abscissa in FIG. 3 shows an integrated value dNH$_3$ sin of the NH$_3$ flowing into the SCR catalyst 6. In FIG. 3, a solid line shows a case in which the SCR catalyst 6 is in a normal condition, and a dot-dash line shows a case in which the SCR catalyst 6 is in an abnormal condition.

As shown in FIG. 3, when the SCR catalyst 6 is in an abnormal condition, the amount of NH$_3$ adsorbed to the SCR catalyst 6 when the rich spike is executed such that the NH$_3$ newly generated by the three-way catalyst 4 and the NSR catalyst 5 flows into the SCR catalyst 6 is smaller than the amount of adsorbed NH$_3$ when the SCR catalyst 6 is in a normal condition.

If the NSR catalyst 5 is in a normal condition when the abnormality determination is performed on the exhaust gas purification apparatus 21, almost all of the NO$_x$ contained in the exhaust gas is occluded to the NSR catalyst 5 during the rich spike cessation period. Hence, during this period, almost no NO$_x$ flows into the SCR catalyst 6, and therefore the amount of NH$_3$ adsorbed in the SCR catalyst 6 is substantially maintained.

Accordingly, when the SCR catalyst 6 is in an abnormal condition, the NH$_3$ adsorption amount QNH$_3$ of the SCR catalyst 6 upon execution of the rich spike that follows the rich spike cessation period is smaller than the NH$_3$ adsorption amount QNH$_3$ obtained when the SCR catalyst 6 is in a normal condition. According to this embodiment, therefore, when the SCR catalyst 6 is in an abnormal condition, the NO$_x$ purification ratio of the exhaust gas purification apparatus 21, calculated from Equation (1) shown above, takes a smaller value than the NO$_x$ purification ratio obtained when the SCR catalyst 6 is in a normal condition.

Hence, according to this embodiment, when an abnormality is present in either the NSR catalyst 5 or the SCR catalyst 6, the abnormality can be detected with a high degree of precision as an abnormality in the exhaust gas purification apparatus 21.

Further, when an attempt is made to detect an abnormality in the SCR catalyst 6 while the NSR catalyst 5 is in a normal condition, the individual NO$_x$ purification ratio of the SCR catalyst 6 must be determined. In this case, a certain amount of NO$_x$ must be allowed to flow into the SCR catalyst 6, and therefore the rich spike cessation period must be lengthened to a degree that allows NO$_x$ to slip out of the normal NSR catalyst 5. In so doing, however, it may be difficult to secure an opportunity to detect an abnormality in the SCR catalyst 6. In this embodiment, on the other hand, when the SCR catalyst 6 is in an abnormal condition, the abnormality can be detected as an abnormality in the exhaust gas purification apparatus 21 without lengthening the rich spike cessation period to such an extent that NO$_x$ slips out of the normal NSR catalyst 5. As a result, an opportunity for abnormality detection can be secured easily.

[Abnormality Detection Flow]

Figure 4:
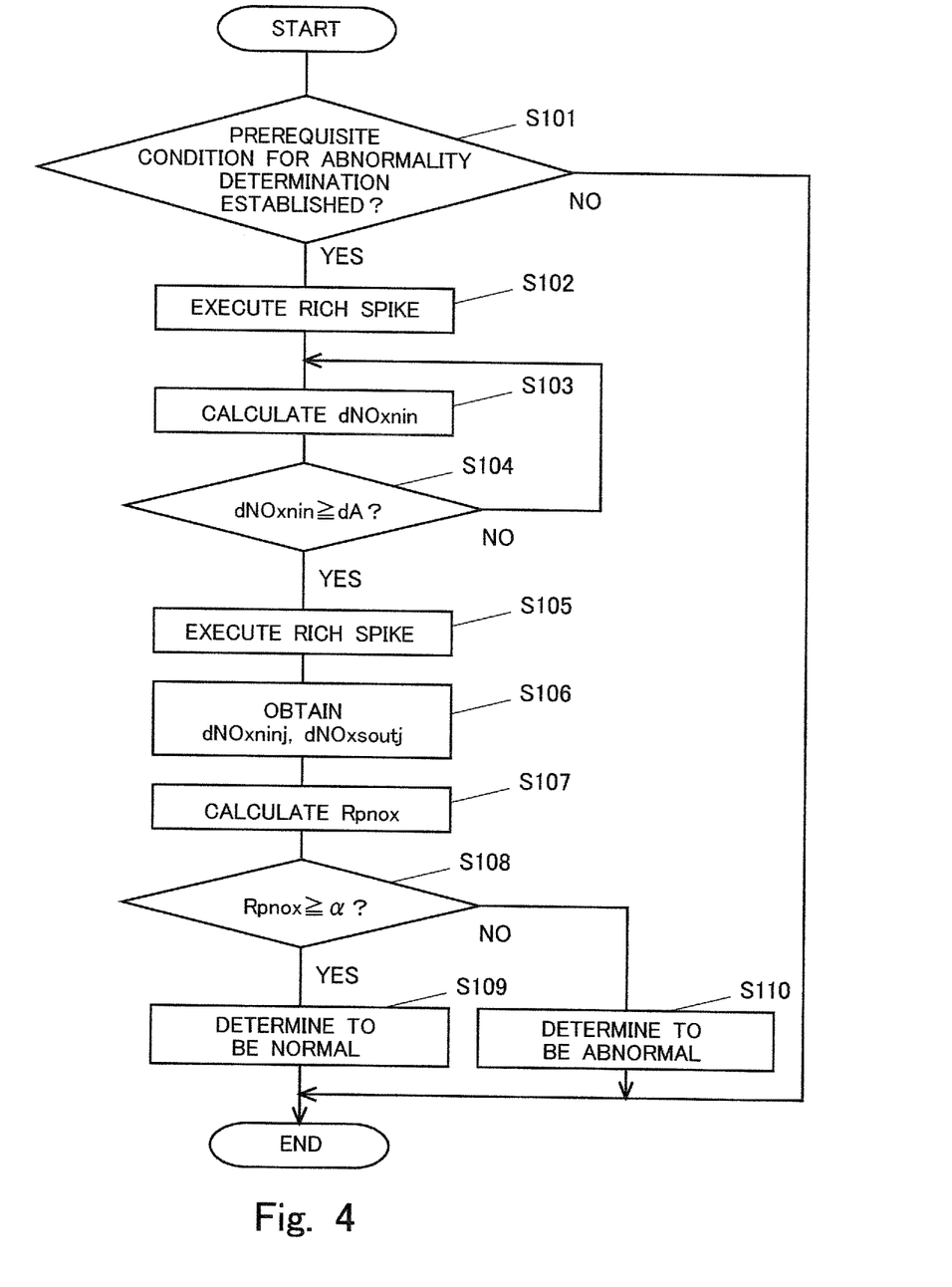
FIG. 4 is a flowchart showing a flow of an abnormality detection performed on the exhaust gas purification apparatus according to a first embodiment.

FIG. 4 is a flowchart showing a flow of the abnormality detection performed on the exhaust gas purification apparatus according to this embodiment. This flow is stored in the ECU 20 in advance, and executed repeatedly by the ECU 20.

First, in step S101 of the flow, a determination is made as to whether or not a prerequisite condition for determining the presence of an abnormality in the exhaust gas purification apparatus 21 is established. The prerequisite condition for determining the presence of an abnormality may be determined to be established when, for example, the temperatures of the NSR catalyst 5 and the SCR catalyst 6 have reached respective activation temperatures, the intake air amount of the internal combustion engine 1 is within a predetermined range, the operating conditions of the internal combustion engine 1 indicate a steady state operation, and so on. Note that the temperature of the NSR catalyst 5 can be estimated on the basis of the output value of the first temperature sensor 11. Further, the temperature of the SCR catalyst 6 can be estimated on the basis of the output value of the second temperature sensor 13.

When the determination of step S101 is negative, execution of the flow is temporarily terminated. When the determination of step S101 is affirmative, processing of step S102 is executed.

In step S102, the rich spike is executed. The rich spike executed here may be a normal rich spike executed to reduce the NO$_x$ occluded to the NSR catalyst 5 or maintain the amount of NH$_3$ adsorbed in the SCR catalyst 6. Alternatively, in the rich spike executed here, the target air-fuel ratio may be reduced below that of a normal rich spike, or the execution period of the rich spike may be lengthened in comparison with that of a normal rich spike. In so doing, the NO$_x$ that cannot be fully reduced during a normal rich spike, among the NO$_x$ occluded to the NSR catalyst 5, can be reduced. As a result, the amount of NO$_x$ occluded to the NSR catalyst 5 upon completion of the rich spike can be brought closer to zero. Accordingly, the amount of NO$_x$ occluded to the NSR catalyst 5 before deriving the integrated value dNO$_x$ninj of the NO$_x$ inflow amount and the integrated value dNO$_x$soutj of the NO$_x$ outflow amount, which are used to calculate the NO$_x$ purification ratio Rpno$_x$ of the exhaust gas purification apparatus 21 in Equation (1), can be kept substantially constant during every abnormality determination. As a result, the NO$_x$ purification ratio of the exhaust gas purification apparatus 21 can be calculated more accurately.

Next, in step S103, the integrated value $dNO_xnin$ of the $NO_x$ inflow amount at the completion point of the rich spike executed in step S102 is calculated.

Next, in step S104, a determination is made as to whether or not the integrated value $dNO_xnin$ of the $NO_x$ inflow amount calculated in step S103 has reached the determination execution value dA. The determination execution value dA, defined as described above, is determined in advance on the basis of experiments and the like, and recorded in the ECU 20.

When the determination of step S104 is negative, the processing of step S103 is repeated. When the determination of step S104 is affirmative, on the other hand, the processing of step S105 is executed.

In step S105, the rich spike is executed again. The rich spike executed here may be performed under similar conditions to a normal rich spike executed to reduce the $NO_x$ occluded to the NSR catalyst 5 or maintain a sufficient $NH_3$ adsorption amount in the SCR catalyst 6. Alternatively, the rich spike executed here may be a rich spike in which the target air-fuel ratio and the execution period are set in order to calculate the $NO_x$ purification ratio of the exhaust gas purification apparatus 21.

Next, in step S106, the integrated value $dNO_xninj$ of the $NO_x$ inflow amount and the integrated value $dNO_xsoutj$ of the $NO_x$ outflow amount over a period extending from the completion point of the rich spike executed in step S102 to the completion point of the rich spike executed in step S105 are obtained.

Next, in step S107, the $NO_x$ purification ratio $Rpno_x$ of the exhaust gas purification apparatus 21 is calculated from Equation (1) on the basis of the integrated value $dNO_xninj$ of the $NO_x$ inflow amount and the integrated value $dNO_x$-$soutj$ of the $NO_x$ outflow amount obtained in step S106.

Next, in step S108, a determination is made as to whether or not the $NO_x$ purification ratio $Rpno_x$ of the exhaust gas purification apparatus 21 calculated in step S107 equals or exceeds a predetermined purification ratio α. The predetermined purification ratio α is a threshold at which it can be determined that the exhaust gas purification apparatus 21 is in a normal condition, or in other words that both the NSR catalyst 5 and the SCR catalyst 6 are in a normal condition. The predetermined purification ratio α is determined in advance on the basis of experiments and the like, and stored in the ECU 20.

When the determination of step S108 is affirmative, the exhaust gas purification apparatus 21 is determined to be in a normal condition in step S109. When the determination of step S108 is negative, on the other hand, the exhaust gas purification apparatus 21 is determined to be in an abnormal condition, or in other words at least one of the NSR catalyst 5 and the SCR catalyst 6 is determined to be in an abnormal condition, in step S110.

When the exhaust gas purification apparatus 21 is determined to be in an abnormal condition in step S110, the driver of the vehicle in which the internal combustion engine 1 is installed may be notified of the abnormal condition.

Note that in this embodiment, the rich spike corresponds to "air-fuel ratio reduction control" according to the present invention, and the ECU 20 that executes the rich spike corresponds to an "air-fuel ratio control unit" according to the present invention. Further, the ECU 20 that executes steps S105 to S108 and S110 in the flow described above corresponds to a "determination unit" according to the present invention.

Further, in this embodiment, when the operating conditions of the internal combustion engine 1 are constant, the $NO_x$ inflow amount during the rich spike execution period and the rich spike cessation period likewise remains substantially constant. In this embodiment, therefore, when the abnormality determination is performed on the exhaust gas purification apparatus 21 on the basis of the flow described above, the $NO_x$ purification ratio of the exhaust gas purification apparatus 21 may be calculated in step S107 on the assumption that the integrated value $dNO_xninj$ of the $NO_x$ inflow amount over the period extending from the completion point of the rich spike executed in step S102 to the completion point of the rich spike executed in step S105 takes a predetermined fixed value.

Furthermore, in this embodiment, when the abnormality determination is performed on the exhaust gas purification apparatus 21 on the basis of the flow described above, control may be performed during the rich spike cessation period to increase the amount of $NO_x$ discharged from the internal combustion engine 1 beyond a normal discharge amount. The control for increasing the amount of $NO_x$ discharged from the internal combustion engine 1 may be realized by, for example, reducing the air-fuel ratio of the air-fuel mixture in the internal combustion engine 1 below the normal air-fuel ratio within a lean air-fuel ratio range, or advancing an ignition timing of the internal combustion engine 1.

When the amount of $NO_x$ discharged from the internal combustion engine 1 during the rich spike cessation period is increased, the integrated value $dNO_xnin$ of the $NO_x$ inflow amount from the completion point of the rich spike executed in step S102 reaches the determination execution value dA earlier, and therefore the rich spike of step S105 can be executed earlier. As a result, the abnormality determination can be performed on the exhaust gas purification apparatus 21 in a shorter period.

Second Embodiment

The basic configuration of the internal combustion engine and the intake/exhaust system thereof according to this embodiment is identical to the first embodiment. The following description focuses mainly on the method of determining an abnormality in the exhaust gas purification apparatus according to this embodiment, which differs from the first embodiment.

[Method of Detecting Abnormality in Exhaust Gas Purification Apparatus]

In this embodiment, similarly to the first embodiment, when an abnormality determination is performed on the exhaust gas purification apparatus, the rich spike is executed again after the elapse of the rich spike cessation period that follows execution of the latest rich spike. Here, the rich spike executed before the rich spike cessation period will be referred to as a "pre-determination rich spike", while the rich spike executed after the rich spike cessation period will be referred to as a "determination rich spike".

In this embodiment, the target air-fuel ratio and the execution period of the pre-determination rich spike are set differently to the first embodiment. More specifically, in this embodiment, the total amount of $NO_x$ flowing out of the NSR catalyst 5 during the execution period of the determination rich spike is estimated before executing the pre-determination rich spike. At this time, the total amount of $NO_x$ flowing out of the NSR catalyst 5 is estimated on the assumption that the NSR catalyst 5 is in a normal condition. The target air-fuel ratio and the execution period of the pre-determination rich spike are then set such that the amount of $NH_3$ adsorbed in the SCR catalyst 6 at the completion point of the pre-determination rich spike is equivalent to the estimated value of the total amount of $NO_x$ flowing out of the NSR catalyst 5. At this time, the target air-fuel ratio and the execution period of the pre-determination rich spike are set on the assumption that both the NSR catalyst 5 and the SCR catalyst 6 are in a normal condition.

As described above, the amount of $NH_3$ generated in the NSR catalyst 5 during the rich spike execution period increases as the target air-fuel ratio of the rich spike decreases and the execution period of the rich spike lengthens. Accordingly, the amount of $NH_3$ adsorbed in the SCR catalyst 6 at the completion point of the rich spike increases. Hence, the target air-fuel ratio of the pre-determination rich spike is set to be lower and/or the execution period of the pre-determination rich spike is lengthened as the estimated value of the total amount of $NO_x$ flowing out of the NSR catalyst 5 during the execution period of the pre-determination rich spike increases.

When the pre-determination rich spike is set as described above and both the NSR catalyst 5 and the SCR catalyst 6 are in a normal condition, substantially all of the $NO_x$ that flows out of the NSR catalyst 5 during execution of the pre-determination rich spike is reduced by the SCR catalyst 6. Further, substantially all of the $NH_3$ adsorbed in the SCR catalyst 6 at the completion point of the pre-determination rich spike is consumed for reduction of the $NO_x$ at this time.

When the NSR catalyst 5 is in an abnormal condition, on the other hand, the total amount of $NO_x$ flowing out of the NSR catalyst 5 during execution of the pre-determination rich spike is larger than when the NSR catalyst 5 is in a normal condition. Further, when the SCR catalyst 6 is in an abnormal condition, the total amount of $NH_3$ adsorbed to the SCR catalyst 6 during execution of the pre-determination rich spike is smaller than when the SCR catalyst 6 is in a normal condition.

Hence, when the pre-determination rich spike is set as described above and at least one of the NSR catalyst 5 and the SCR catalyst 6 is in an abnormal condition, the entire amount of $NO_x$ flowing out of the NSR catalyst 5 during execution of the pre-determination rich spike cannot be reduced by the SCR catalyst 6, and instead, a part thereof flows out of the SCR catalyst 6.

According to this embodiment, therefore, a difference in the $NO_x$ purification ratio of the exhaust gas purification apparatus 21, which is calculated from Equation (1) shown above when the abnormality determination is performed on the exhaust gas purification apparatus 21, between a case in which the NSR catalyst 5 or the SCR catalyst 6 is in an abnormal condition and a case in which the catalysts are both in a normal condition can be increased. As a result, an abnormality can be detected in the exhaust gas purification apparatus 21 with a higher degree of precision.

[Abnormality Detection Flow]

Figure 5:
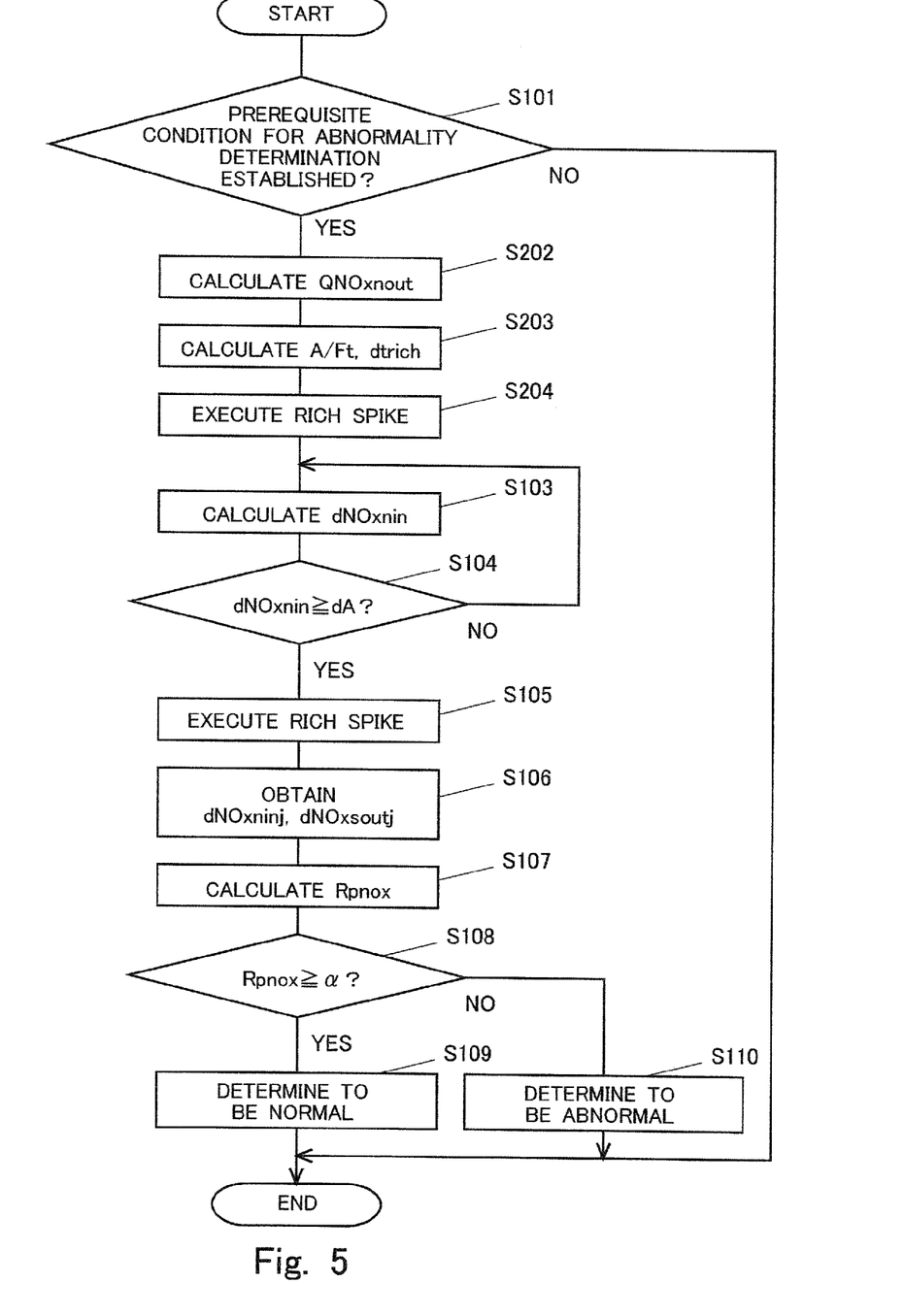
FIG. 5 is a flowchart showing a flow of an abnormality detection performed on the exhaust gas purification apparatus according to a second embodiment.

FIG. 5 is a flowchart showing a flow of an abnormality detection performed on the exhaust gas purification apparatus according to this embodiment. This flow is stored in the ECU 20 in advance, and executed repeatedly by the ECU 20. With regard to this flow, only points that differ from the abnormality detection flow (the flowchart shown in FIG. 4) executed in relation to the exhaust gas purification apparatus according to the first embodiment will be described.

In this flow, when the determination of step S101 is affirmative, a total amount $QNO_x$nout of $NO_x$ flowing out of the NSR catalyst 5 during the execution period of the rich spike executed in step S105 (i.e. the pre-determination rich spike) is calculated in step S202.

Here, the total amount $QNO_x$nout of $NO_x$ flowing out of the NSR catalyst 5 is calculated on the assumption that the NSR catalyst 5 is in a normal condition. The total amount $QNO_x$nout of $NO_x$ flowing out of the NSR catalyst 5 can be calculated on the basis of the target air-fuel ratio, the execution period, and so on of the pre-determination rich spike. In this embodiment, relationships between parameters such as the target air-fuel ratio and execution period of the pre-determination rich spike and the total amount of $NO_x$ flowing out of the NSR catalyst 5 during the rich spike execution period are determined in advance on the basis of experiments and the like. These relationships are then stored in the ECU 20 in the form of a map or a function. In step S202, the total amount $QNO_x$nout of $NO_x$ flowing out of the NSR catalyst 5 during the execution period of the pre-determination rich spike is calculated using this map or function.

Next, in step S203, a target air-fuel ratio A/Ft and an execution period dtrich of the rich spike (the pre-determination rich spike) to be executed in step S204, i.e. the next step, are calculated. Here, the target air-fuel ratio A/Ft and the execution period dtrich of the pre-determination rich spike are calculated such that the amount of $NH_3$ adsorbed in the SCR catalyst 6 at the completion point of the pre-determination rich spike is equivalent to the total amount $QNO_x$nout of $NO_x$ flowing out of the NSR catalyst 5 during the execution period of the pre-determination rich spike, calculated in step S202. Further, the target air-fuel ratio A/Ft and the execution period dtrich of the pre-determination rich spike are calculated here on the assumption that both the NSR catalyst 5 and the SCR catalyst 6 are in a normal condition.

In this embodiment, a relationship between the total amount of $NO_x$ flowing out of the NSR catalyst 5 and the equivalent amount of $NH_3$ adsorbed in the SCR catalyst 6 is stored in the ECU 20 in the form of a map or a function. Moreover, relationships between the target air-fuel ratio and execution period of the pre-determination rich spike and the amount of $NH_3$ adsorbed in the SCR catalyst 6 at the completion point of the pre-determination rich spike is determined in advance on the basis of experiments and the like. These relationships are likewise stored in the ECU 20 in the form of a map or a function. In step S203, the target air-fuel ratio A/Ft and the execution period dtrich of the pre-determination rich spike are calculated using these maps or functions.

Next, in step S204, the pre-determination rich spike is executed. At this time, the target air-fuel ratio and the execution period of the pre-determination rich spike are set at the values calculated in step S203.

What is claimed is:

1. An abnormality detection apparatus for an exhaust gas purification apparatus provided in an exhaust passage of an internal combustion engine, the exhaust gas purification apparatus including an $NO_x$ storage reduction catalyst and an $NO_x$ selective reduction catalyst, the $NO_x$ selective reduction catalyst reducing $NO_x$ using $NH_3$ as a reducing agent, and being disposed on a downstream side of the $NO_x$ storage reduction catalyst, the abnormality detection apparatus comprising:

an air-fuel ratio control unit that executes air-fuel ratio reduction control to reduce an air-fuel ratio of exhaust gas flowing into the $NO_x$ storage reduction catalyst temporarily to an extent at which a peripheral atmosphere of the $NO_x$ storage reduction catalyst becomes a reducing atmosphere;

a $NO_x$ inflow amount acquisition unit that acquires a $NO_x$ inflow amount, which is an amount of $NO_x$ flowing into the $NO_x$ storage reduction catalyst; and a $NO_x$ outflow amount acquisition unit that acquires a $NO_x$ outflow amount, which is an amount of $NO_x$ flowing out of the $NO_x$ selective reduction catalyst; and a determination unit that determines, when the air-fuel ratio reduction control is executed again by the air-fuel ratio control unit when the integrated value of the $NO_x$ inflow amount following completion of a latest air-fuel ratio reduction control reaches a predetermined threshold, whether or not the exhaust gas purification apparatus is in an abnormal condition on the basis of a $NO_x$ purification ratio of the exhaust gas purification apparatus, which is calculated from an integrated value of the $NO_x$ inflow amount and an integrated value of the $NO_x$ outflow amount over a period extending from a completion point of the latest air-fuel ratio reduction control executed by the air-fuel ratio control unit to completion of the air-fuel ratio reduction control that is executed again by the air-fuel ratio control unit, wherein the threshold is set at an upper limit value of an amount of $NO_x$ that can be occluded to the $NO_x$ storage reduction catalyst in a normal condition.

2. The abnormality detection apparatus for an exhaust gas purification apparatus according to claim 1, wherein, a target air-fuel ratio and a control execution period of the latest air-fuel ratio reduction control executed by the air-fuel ratio control unit are set such that an amount of $NH_3$ adsorbed in the $NO_x$ selective reduction catalyst upon completion of the precious air-fuel ratio reduction control is equivalent to a total amount of $NO_x$ flowing out of the $NO_x$ storage reduction catalyst during an execution period of the air-fuel ratio reduction control executed again by the air-fuel ratio control unit, when both the $NO_x$ storage reduction catalyst and the $NO_x$ selective reduction catalyst are in a normal condition.

* * * * *